United States Patent [19]
Spera

[11] Patent Number: 5,263,296
[45] Date of Patent: Nov. 23, 1993

[54] MODULAR SCAFFOLDING ASSEMBLY

[75] Inventor: Vittorio Spera, St. Leonard, Canada

[73] Assignee: SperalAluminium Inc., St. Leonard, Canada

[21] Appl. No.: 731,275

[22] Filed: Jul. 17, 1991

[51] Int. Cl.⁵ .......................... E04C 3/30; E04G 1/20
[52] U.S. Cl. ............................ 52/638; 52/646; 52/584; 182/179; 403/237
[58] Field of Search .......... 52/646, 648, 645, 638, 52/282, 584, 59, 721, 637; 182/179, 178; 403/227, 234, 237, 255

[56] References Cited

U.S. PATENT DOCUMENTS

| | | | |
|---|---|---|---|
| 3,456,966 | 7/1969 | Muller | 403/237 |
| 3,564,802 | 10/1969 | Dreyfus | 52/637 |
| 3,742,662 | 7/1973 | Ballou | 52/646 |
| 4,057,943 | 11/1977 | Lienhard | 52/126 |
| 4,142,343 | 3/1979 | Trafton | 256/59 |
| 4,291,812 | 9/1981 | Harmes et al. | 403/234 |
| 4,350,318 | 9/1982 | Gallis | 52/584 |
| 4,458,461 | 7/1984 | Holley | 52/282 |
| 4,481,748 | 11/1984 | D'Alessio et al. | 182/179 |
| 4,787,183 | 11/1988 | Johnston | 52/646 |
| 4,841,708 | 6/1989 | Johnston | 52/646 |
| 4,907,388 | 3/1990 | Siahatgar | 52/584 |
| 4,984,654 | 1/1991 | Anderson | 182/179 |
| 5,031,224 | 7/1991 | Quinn | 182/179 |

FOREIGN PATENT DOCUMENTS

| | | |
|---|---|---|
| 0049096 | 4/1982 | European Pat. Off. . |
| 0252748 | 1/1988 | European Pat. Off. . |
| 0311491 | 4/1989 | European Pat. Off. ............ 182/179 |
| 0389256 | 9/1990 | European Pat. Off. . |
| 0408210 | 1/1991 | European Pat. Off. . |
| 3641349 | 6/1988 | Fed. Rep. of Germany . |
| 2655393 | 6/1991 | France . |
| 263882 | 9/1949 | Switzerland . |

OTHER PUBLICATIONS

Alu-Schalungsgerust Ischebeck Titan.

Primary Examiner—Carl D. Friedman
Assistant Examiner—Winnie Yip
Attorney, Agent, or Firm—Wenderoth, Lind & Ponack

[57] ABSTRACT

The invention relates to a scaffolding assembly for use in structural shoring. The assembly includes an elongate post which has a receiving mechanism for a bracing member. The receiving mechanism runs longitudinally of the post and presents an abutment surface facing outwardly from the post. The receiving mechanism further has a pair of longitudinal edges, each of which extends from the abutment surface so as to form a respective gap between the post and the longitudinal edges of the receiving mechanism. The bracing member is for connection between two adjacent posts of the scaffolding assembly, the member having a terminal end for flush contact with the abutment surface on the post. The bracing member further provides a gripping mechanism adjacent the same terminal end. The gripping mechanism engages the longitudinal edges of the receiving mechanism to thereby secure the bracing member to the post. When the gripping mechanism of the bracing member is engaged with the longitudinal edges, the terminal end of the bracing member is maintained in contact with the abutment surface of the post.

14 Claims, 10 Drawing Sheets

MODULAR SCAFFOLDING ASSEMBLY

FIELD OF THE INVENTION

The present invention relates generally to the field of structural shoring and more particularly, to a modular scaffolding assembly well-suited for use in concrete forming structures.

BACKGROUND OF THE INVENTION

It has been known heretofore to employ various types of scaffolding structures in order to provide temporary means of shoring or load support in a number of industrial applications, particularly in building construction. Other types of known scaffolding arrangements are conceived and designed so as to allow workpersons convenient access to various elevations above ground level.

There are a number of problems and inconveniences associated with these known scaffolding systems. For instance, some of these systems have heavy and cumbersome constituent parts, such as post members, bracing members, ledger beams and transverse joists, which makes the transport and handling of such parts rather difficult. Other known scaffolding systems are not very versatile, in that they do not easily permit the same constituent elements to be employed in a large variety of structural configurations to suit different applications. Still other prior art scaffolding systems and techniques of assembly therefor do not permit the quick and easy assembly and disassembly of the structural components comprising the scaffolding assembly, thereby increasing the labour time on the job site which must be dedicated to scaffolding operations.

In addition to the foregoing disadvantages, many of the prior art scaffolding systems and assembly techniques for such systems are not well-suited for use in the so-called "flying form" structures well known to those skilled in this art. Such flying form structures are utilized typically in the pouring of concrete floor slabs, such that when the poured wet concrete which is supported by the scaffolding assembly during its curing phase has sufficiently set, the entire scaffolding assembly may be removed as a substantially integral unit and hoisted or "flown" above the newly cured first floor slab in order to support the pouring of another floor slab located above the first.

It is therefore an object of the present invention to provide a modular scaffolding system whose constituent structural components are all amenable to manufacture by extrusion, thereby permitting the parts to be composed of relatively lightweight but strong aluminum alloys, thereby facilitating the handling and transport of these parts.

It is a further object of the present invention to provide a modular scaffolding assembly which can be assembled in a variety of different structural configurations, and for which the bracing members between two adjacent post members of the assembly may be provided in a number of prefabricated planar arrangements, to thereby suit the particular shoring needs at hand.

It is another object of the present invention to provide a modular scaffolding assembly which provides a secure yet convenient attachment technique for connecting the bracing members thereof to the post members of the assembly, so as to facilitate the assembly and disassembly of the scaffolding system on the construction site.

It is yet another object of the present invention to provide a modular scaffolding assembly wherein height adjustment means may be provided at either or both ends of each post member of the system, thereby making the scaffolding system according to the present invention more suitable for use in the shoring of uneven overhead surfaces or for secure and level placement on irregular ground surfaces.

It is yet another object of the present invention to provide a modular scaffolding assembly which is amenable to use in flying form structures.

These and other objects and advantages of the present invention will be apparent from the following detailed description of the invention and the preferred embodiments thereof.

SUMMARY OF THE INVENTION

The present invention provides a modular scaffolding assembly which is intended to overcome a number of the inconveniences and disadvantages associated with the prior art scaffolding systems and assembly methods discussed above.

According to a broad aspect of the present invention, there is provided a scaffolding assembly for use in structural shoring; said assembly comprising:

an elongate post member, said post member providing at least one receiving means, said receiving means running in a direction longitudinally of said post member and presenting an abutment surface facing outwardly of said post member, said receiving means further having a pair of longitudinal edges, each of which extends outwardly from the said abutment surface so as to form a respective gap between said post member and said longitudinal edges of the receiving means thereof;

at least two fastener means, said fastener means each having a head portion and a shank portion;

a bracing member for connection between two adjacent post members of the assembly, said bracing member having a terminal end for flush contact with said abutment surface of said receiving means, the bracing member further having at least one pair of substantially T-shaped and outwardly open continuous slots running longitudinally of the bracing member, said slots each slidably retaining the head of one of said fastener means while allowing the shank thereof to extend outwardly from said slots; and gripping means provided adjacent said terminal end of said bracing member, said gripping means constituting means for engaging said longitudinal edges of said receiving means to thereby secure said bracing member to the post member, said terminal end of the bracing member contacting said abutment surface when the gripping means is engaged with the longitudinal edges of said receiving means, said gripping means comprising a pair of opposed plates, said plates each having a corresponding groove therein at one end thereof for mating respectively with said longitudinal edges of said receiving means, said plates each further having a corresponding aperture means therein for respective slidable engagement of said plates with a corresponding shank of said fastener means; the gripping plates being urged together by the respective displacement thereof along the shanks of said fastener means so as to secure said bracing member to the post member.

In preferred embodiments of the present invention, the gripping means of the bracing member is a pair of opposed plates. Each of the plates has a corresponding groove therein for mating with one of the longitudinal edges of a receiving means of the post member, the gripping plates of the bracing member being urged together so as to secure the bracing member to the post member.

The bracing member may also be provided with at least one pair of T-shaped and outwardly open slots which run longitudinally of the bracing member. The slots are intended for retaining the head of a blot fastener while allowing the shank thereof to extend outwardly from the slots. If desired, then, the gripping plates may be attached to the bracing member by means of bolt fasteners retained by these T-shaped slots provided in the member.

In an alternative embodiment of the present invention, the abutment surface of the post member is located in a groove running longitudinally of the post member, the terminal end of the bracing member being received in the groove.

According to further preferred embodiments of the invention, a plurality of bracing members may be provided in a prefabricated planar arrangement for connection to any two adjacent post members. In this arrangement, the bracing members are connected the one to the other by means of connector plates attached to adjacent members by bolt fasteners which are retained by the T-shaped slots of the bracing members, as discussed above.

Preferably, height adjustment means are included for the post members, the height adjustment means comprising a screwjack having one end thereof which is slidably received in slip-fit engagement with a corresponding longitudinal bore in the post, and having the other end thereof provided with a support plate which can be used at either end of the post member. In this way, the support plate may be used either for secure placement of the post on the surface of the ground, or for supporting structural members or any other overhead surface which is to be shored by the scaffolding assembly. The support plates may also be provided with a plurality of slots at the peripheral edges thereof so as to allow two of the plates to be placed in a back-to-back configuration whereby the plates are affixed the one to the other by bolt fasteners received in such slots. This type of arrangement therefore permits two post members to be placed one atop the other in a spliced configuration whenever it is desired or necessary to increase the vertical extension of the posts.

For greater convenience of use, the support plates for the posts of the scaffolding assembly may each have a substantially planar support surface and provide a channel recessed therefrom for receiving various fastening means for easier attachment of the scaffolding system to structural members which are to be shored thereby.

Preferably, the screwjack of the height adjustment means has a collar nut thereon which abuts with either terminal end of the post adjacent the bore therein which receives the screwjack. The collar nut is rotatably displaceable along the length of the screwjack to thereby adjust the longitudinal extension of the screwjack with respect to each post. In order to facilitate the rotatable displacement of the collar nut along the length of the screwjack as aforesaid, the collar nut also preferably provides a plurality of handle means extending radially therefrom.

If the height adjustment means for the scaffolding assembly are not employed, the support plates for the posts may be connected thereto by means of a connecting sleeve. The sleeve, like the screwjack described above, is slidably received in slip-fit engagement with a corresponding bore provided at the terminal ends of each post and is retained therein by screw fasteners or the like.

The support plates for the scaffolding assembly are connected to either the screwjack or sleeve of the posts, as the case may be, by means of a cruciform connector element fixed to each support plate. The element has four substantially perpendicularly disposed webs, whose terminal ends have curved flanges extending therefrom. The connector element is received in a corresponding bore in the screwjack or sleeve by sliding engagement of the outer surfaces of the flanges with the bore. The connector element is retained in the bore of the screwjack or sleeve by at least one headless screw fastener introduced through the outer surface of the screwjack or sleeve and into one of the curved flanges of the connector element. Preferably, the connector element has a central cylindrical portion for receiving a bolt fastener for affixing the connector to the support plate as previously specified.

When using the scaffolding assembly according to the present invention for a flying form configuration, a stopper means is provided on the post for retaining the height adjustment means of the post members within the receiving bores of the posts when the scaffolding assembly is lifted off the ground or other support surface therefor. Preferably, the stopper means is a U-shaped arm having one leg thereof affixed adjacent the terminal end of the post with the other end of the arm being located below the collar nut of the screwjack. This configuration for the stopper means allows for rotation of the collar nut on the screwjack without obstruction.

The scaffolding assembly according to the present invention is advantageously amenable to manufacture by metal extrusion processes. Thus, each of the post members, bracing members, support plates and sleeves therefor may be composed of any structurally suitable aluminium alloy, if desired. As well, according to the preferred embodiments described in greater detail hereinbelow, the post members, bracing members, screwjacks and sleeves all have a hollow cross-sectional configuration, thereby reducing the weight of the constituent structural components of the scaffolding assembly of the present invention.

BRIEF DESCRIPTION OF THE DRAWINGS

For purposes of illustration but not of limitation, preferred embodiments of the present invention are described hereinbelow with reference to the following drawings in which.

DETAILED DESCRIPTION OF PREFERRED EMBODIMENTS

Figure 1:
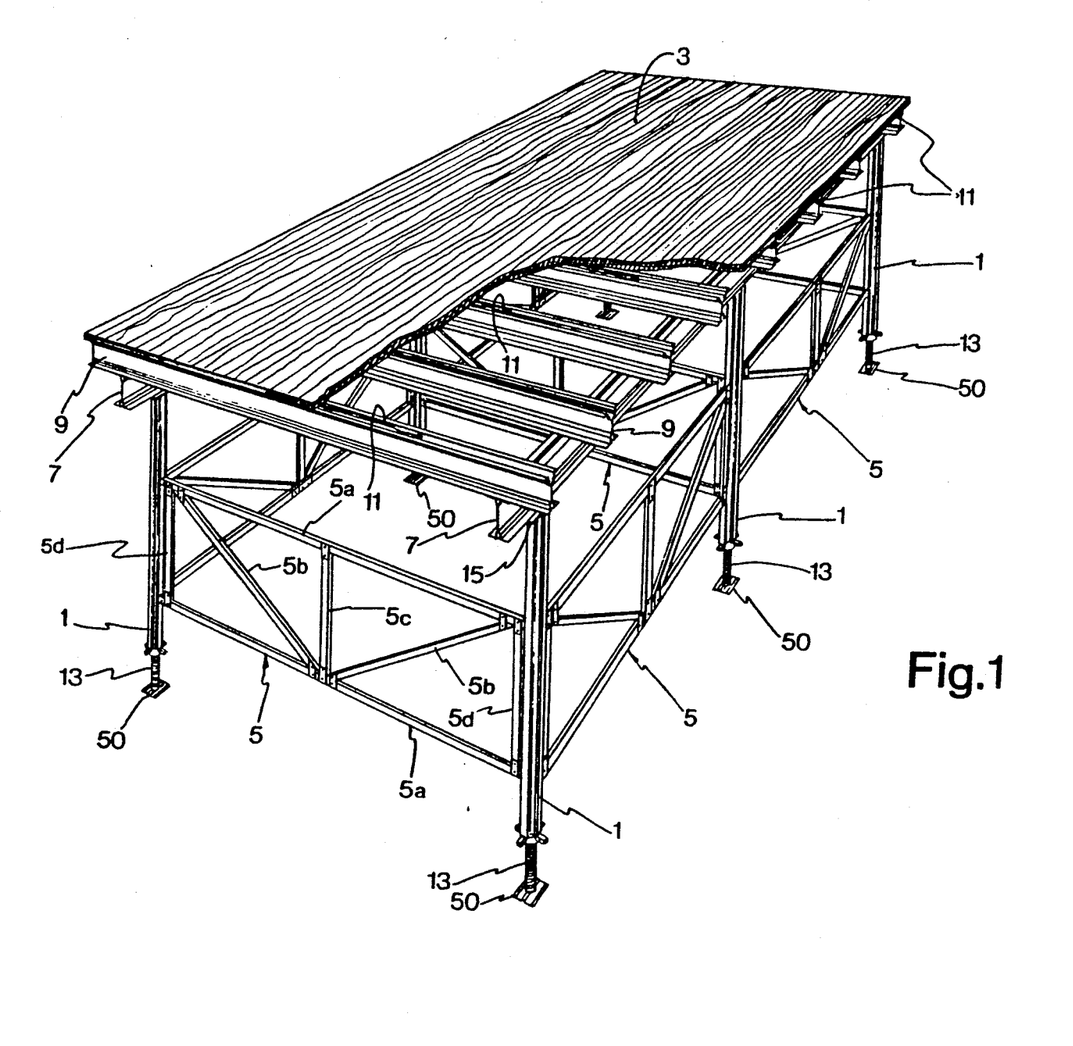
FIG. 1 is a perspective view showing a typical structural configuration for the modular scaffolding assembly according to the present invention, intended for the pouring of concrete floor slabs.

As shown for a typical scaffolding arrangement intended for the shoring of concrete floor slabs, the modular scaffolding assembly of the present invention comprises a plurality of post members 1 which are vertically disposed with respect to a sheathing panel 3 which is to be supported thereby. The sheathing panel 3 is typically composed of one or more plywood panels or the like which are in contact with the concrete to be poured thereon. Adjacent vertical post members 1 are connected the one to the other by means of a plurality of bracing members 5, in the manner to be described in greater detail hereinbelow. A pair of substantially parallel and horizontally disposed ledger beams 7 are connected to the upper terminal ends of the post members 1 by means of support plates 15, and these ledger beams in turn support a plurality of horizontally disposed joist beams 9 placed thereacross. As is well known to those skilled in this art, the joist beams 9 have their upper ends adapted to receive elongate wooden inserts 11 in press-fit engagement therewith. When one or more sheathing panels 3 are placed atop the joist beams 9, a suitable number of nails or other like fasteners may be driven through the sheathing panels and into the wooden inserts 11 held by the joist beams 9.

In the scaffolding configuration shown in FIG. 1, height adjustment means 13 extend from the lower terminal ends of the post members 1, so that the scaffolding assembly can be securely placed on an irregular support surface while maintaining the sheathing panels 3 level. At the terminal ends of the post members 1 opposite to the height adjustment means 13, support plates 15 are used to connect the post members 1 to the ledger beams 7. The details of construction and interconnection of these various component parts for the modular scaffolding assembly of the present invention are next provided below.

Figure 2:
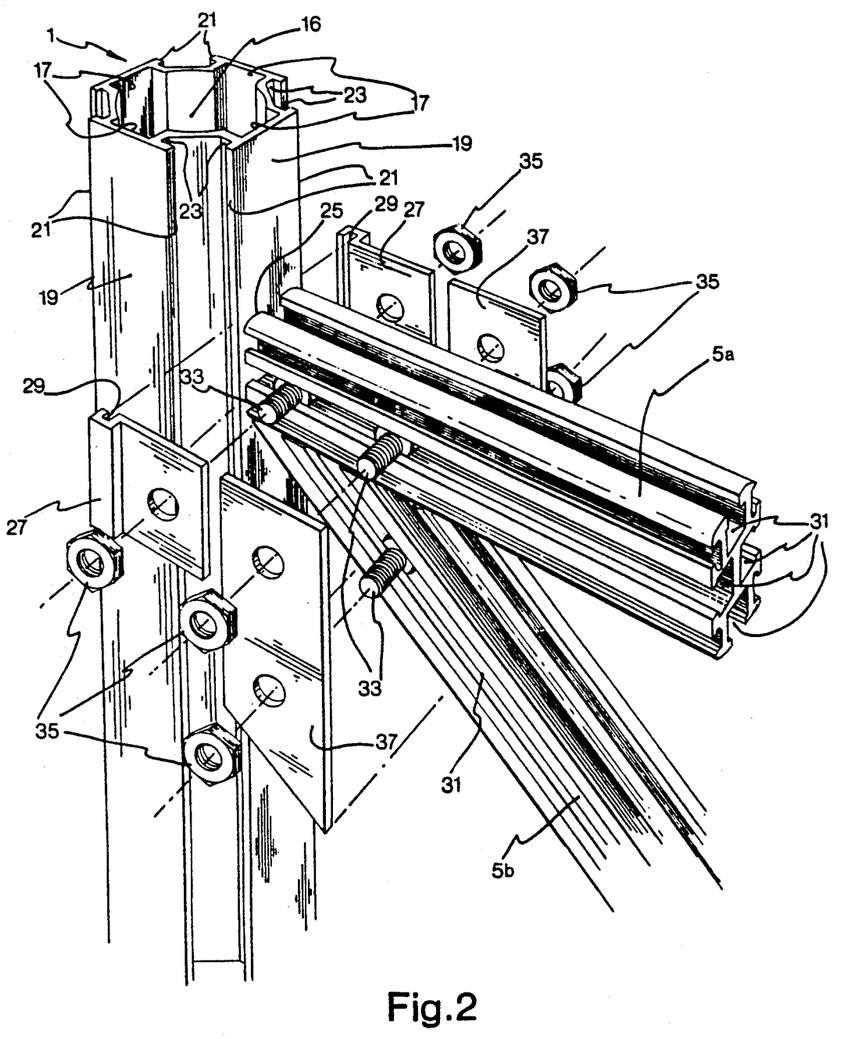
FIG. 2 is a detailed exploded perspective view of a vertical post member and bracing members of the modular assembly, illustrating the connection of the post member to a horizontal bracing member by means of gripping plates provided adjacent the terminal end of the horizontal bracing member.
Figure 3:
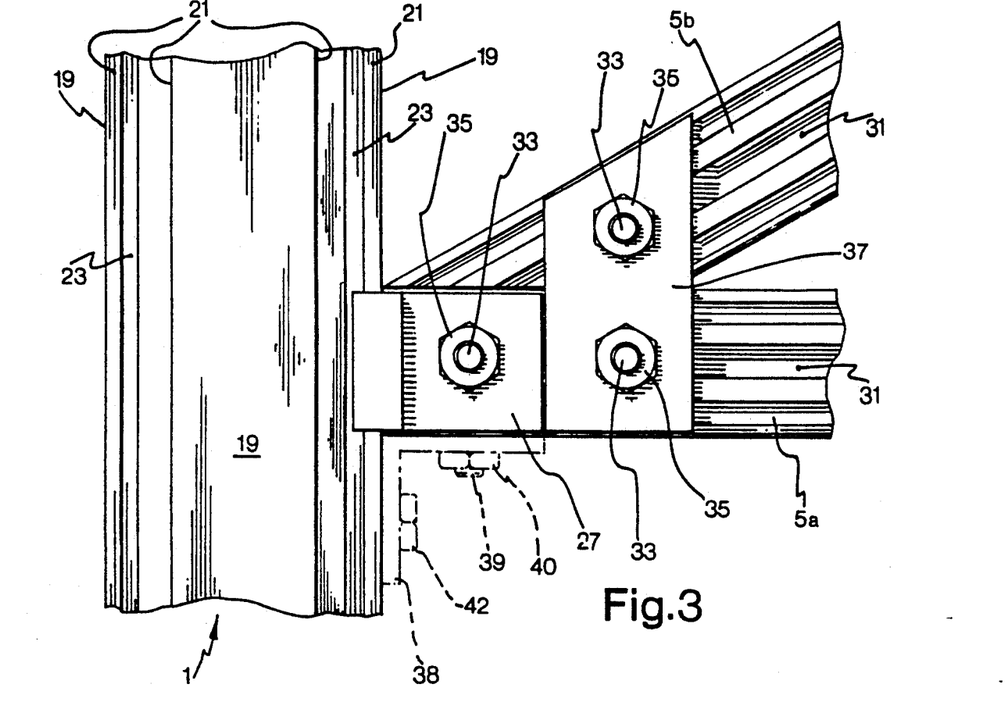
FIG. 3 is a side view of a horizontal bracing member secured to a post member of the assembly, showing an L-shaped safety bracket in phantom lines for supporting the underside of the bracing member to provide greater structural security.
Figure 4:
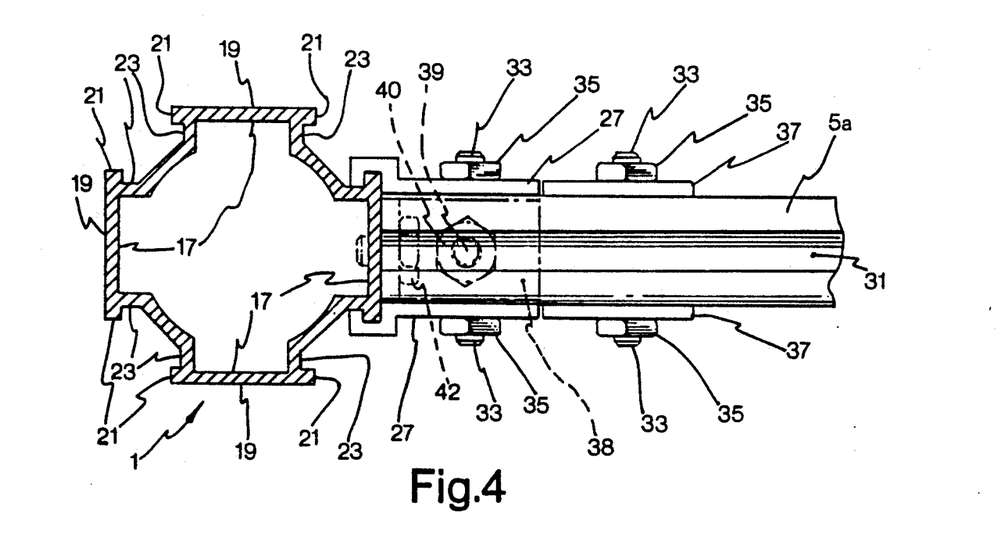
FIG. 4 is a bottom plan view of the connection shown in FIG. 3.

As best shown in FIGS. 2 to 4, each post member 1 has a substantially hollow cross-sectional configuration, and is therefore well suited to manufacture by metal extrusion processes. Advantageously, then, the post members 1 are capable of being constructed from structurally suitable aluminium alloys. The post member 1 is elongate and preferably provides four receiving means 17 for the bracing members 5. The receiving means 17 run in a direction longitudinally of the post member 1 and are each preferably disposed therearound at substantially 90 degree intervals. Each of the receiving means 17 presents an abutment surface 19 which faces outwardly of the post member 1. The four receiving means 17 further each have a pair of longitudinal edges 21, each of which extends from the abutment surface 19 so as to form a respective gap 23 between the post member 1 and the longitudinal edges 21 of the receiving means 17.

Each horizontal bracing member 5a for connection between two adjacent post members 1 of the modular scaffolding assembly has terminal ends 25 which are squared for flush contact with the abutment surface 19 of the receiving means 17 of the post members 1.

A gripping means consisting of two opposed gripping plates 27 is provided at each of the terminal ends of the horizontal bracing members 5a in order to connect them to their corresponding post members 1. The gripping plates 27 engage with the longitudinal edges 21 of the receiving means 17 of the post members 1 to thereby secure the horizontal bracing members 5a thereto. The gripping plates 27 each provides a corresponding groove 29 therein at one end thereof for mating respectively with the longitudinal edges 21 of the receiving means 17. Thus, in order to secure the horizontal bracing members 5a to the post members 1 the gripping plates 27 are urged together. When so engaged with the longitudinal edges 21 of the post member 1, the squared terminal ends 25 of the horizontal bracing members 5a bear against the abutment surface 19 of the receiving means 17 of the post members 1. This is best shown in FIG. 4 of the drawings.

Each of the bracing members 5 is preferably provided with at least one pair of substantially T-shaped and outwardly open slots 31 running longitudinally of the member. These slots 31 are capable of retaining the head of bolt fasteners 33 while allowing the shanks thereof to extend outwardly from the slots. Such bolt fasteners 33 retained by the T-shaped slots 31 of the bracing members 5 can therefore advantageously be used in order to attach the gripping plates 27 to the bracing members 5 by means of hexagonal nuts 35, wing nuts (not shown), or like securing means.

As well, a horizontal bracing member 5a may be secured to a transverse bracing member 5b by means of a connector plate 37 by bolt fasteners 33 and nuts 35 also retained by the T-shaped slots 31 of the bracing members 5.

As shown in FIGS. 3 and 4, an L-shaped safety bracket 38 may be employed to support the underside of the horizontal bracing member 5a to provide greater structural security if needed in a particular application or configuration. The bracket 38 is secured to the underside of the horizontal bracing member 5a by means of a bolt 39 retained in a T-shaped slot of the member, a nut 40 completing the assembly. The bracket 38 may be affixed to the abutment surface 19 of the post member 1 by a screw fastener 42 or the like.

Figure 5:
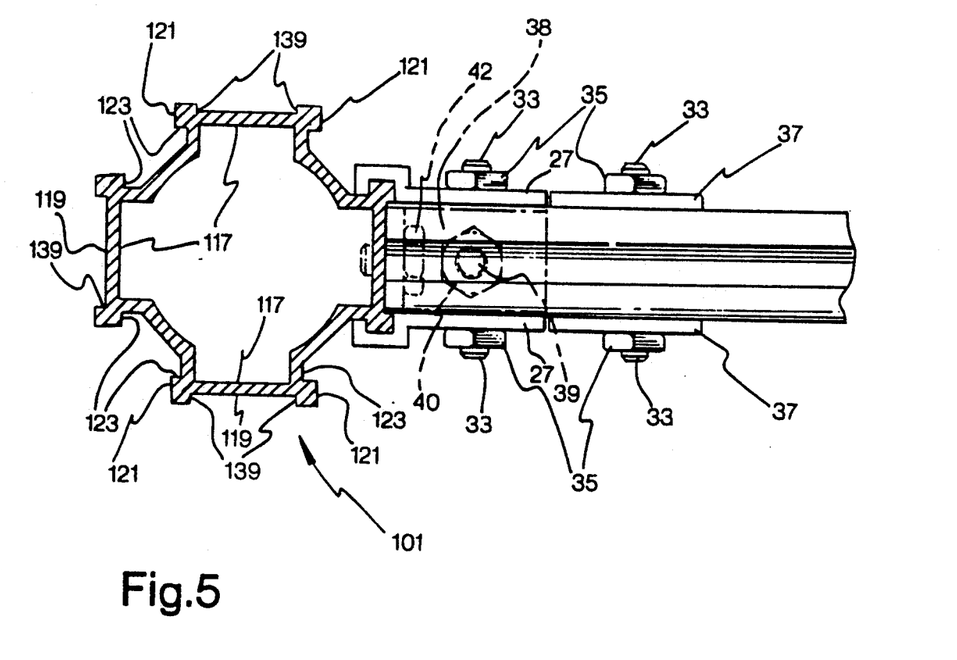
FIG. 5 is a plan view similar to FIG. 4, but showing an alternative post member having grooves therein for receiving the terminal end of a bracing member.

An alternative embodiment constituting a post member 101 is shown in FIG. 5, the like reference numerals of the member 101 referring to the analogous parts also found on the post member 1. The post member 101 has its abutment surface 119 located in a groove 139 running longitudinally of the post. The terminal end of bracing member 5 is therefore received in and restrained from lateral movement by the groove 139 as the member 5 bears against the abutment surface 119 of the post member 101. This construction of the post member 101 therefore facilitates the centering of a bracing member 5 on the receiving means 117 of the post member 101 while the gripping plates 27 are being urged together to secure the bracing member to the post. Those skilled in this art will appreciate that the features and advantages of the present invention discussed below in relation to the post member 1 also apply to the post member 101.

Figures 6, 7:
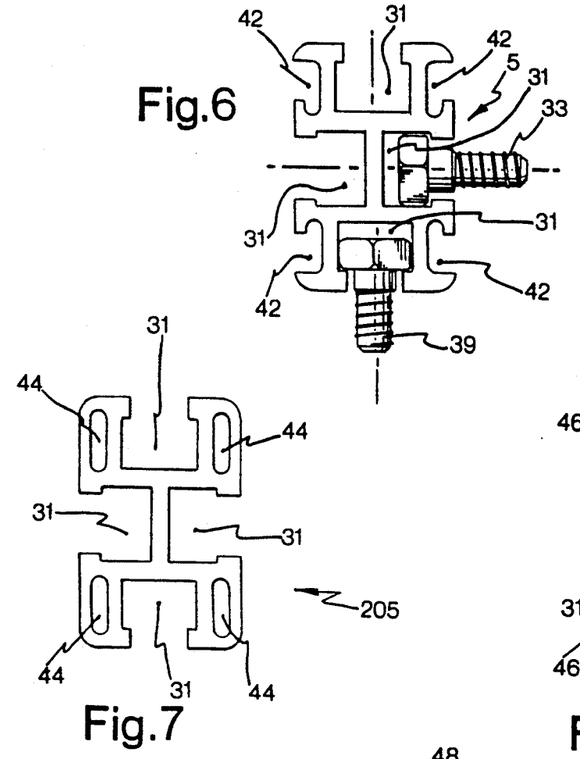
FIGS. 6 to 9 are cross-sectional views of various types of bracing members which can be used between any two adjacent post members of the scaffolding assembly according to the present invention.

Turning now to FIGS. 6 to 9, there are shown various different cross-sectional configurations for the bracing members 5. In FIG. 6, the bracing member 5 provides four T-shaped slots 31 previously described for retaining the heads of bolts 33, 39 as shown. Moreover, the bracing member 5 is characterized by a plurality of side grooves 42 running longitudinally the entire length of the member in order to reduce the weight thereof.

In bracing member 205 of FIG. 7, the side grooves 42 are replaced by internal longitudinal cavities 44 which also run the entire length of the bracing member 205 and serve for weight reduction.

Figure 8:
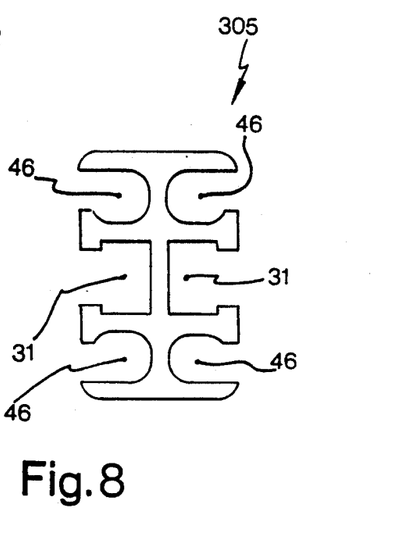

The bracing member 305 of FIG. 8 provides only two T-shaped slots 31 in the sides thereof. Adjacent each corner of the member 305, there are provided a plurality of rounded longitudinal slots 46 in order to reduce the overall weight of the bracing member.

Figure 9:
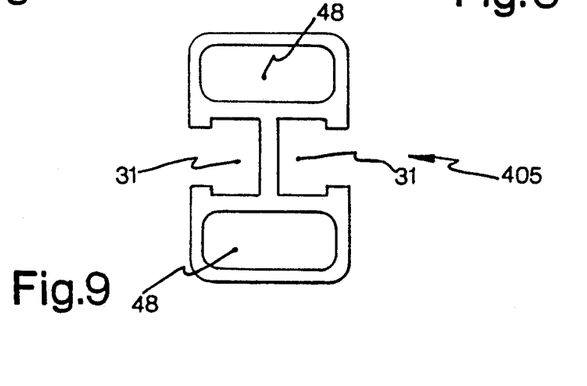

Still a further variant of the bracing members for use with the scaffolding assembly according to the present invention is the bracing member 405 shown in FIG. 9. The bracing member 405, like bracing member 305, provides only two T-shaped slots 31, the rounded slots 46 of bracing member 305 being replaced by single upper and lower longitudinal cavities 48.

All of the various bracing members illustrated in FIGS. 6 to 9 may be integrally extruded from a structurally suitable aluminum alloy, if desired.

Figure 10:
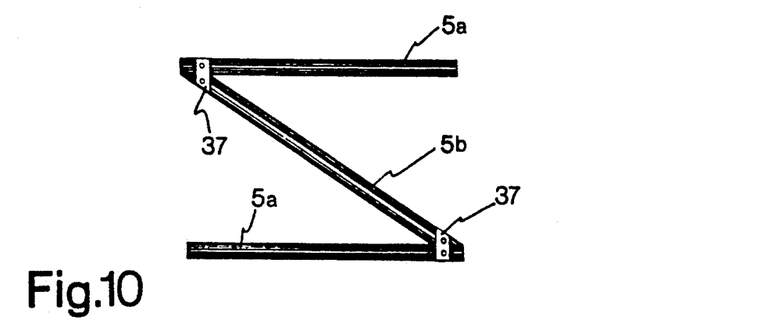
FIGS. 10 to 13 are plan views of four different prefabricated planar arrangements of bracing members for the scaffolding system of the present invention.
Figure 11:
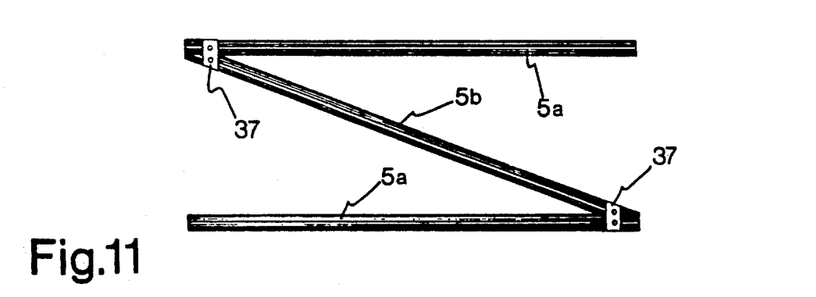

Preferably, a plurality of bracing members 5 is provided in any one of a number of prefabricated planar arrangements for connection to post members 1 or 101 of the scaffolding assembly of the present invention. Representative examples of such prefabricated arrangements of bracing members 5 are shown in FIGS. 10 to 13. Thus, FIGS. 10 and 11 show two sizes of planar arrangements for the bracing members 5, wherein two horizontal bracing members 5a, in a spaced apart and parallel configuration, are connected to a transverse bracing member 5b by means of the connector plates 37 previously described.

Figure 12:
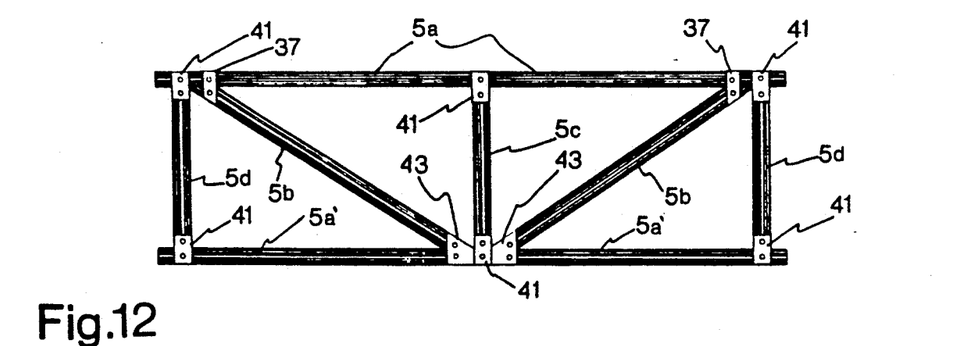
Figure 13:
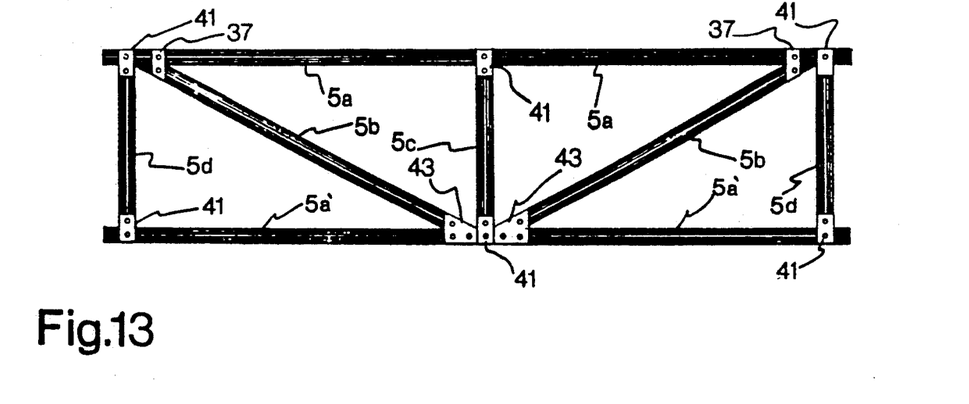

In FIGS. 12 and 13, the planar arrangement of bracing members 5 comprises respective top and bottom horizontal bracing members 5a, 5a' separated by a centrally disposed vertical bracing member 5c, the members 5a, 5a' being connected to the terminal ends of the member 5c by connector plates 41. Two transverse bracing members 5b are used to join each terminal end of the top bracing member 5a to the bottom bracing member 5a' adjacent the lower terminal end of vertical bracing member 5c. Once again, the connections between bracing members is made by means of connector plates 43. As shown in FIGS. 12 and 13, vertical end bracing members 5d may be used to connect the opposed terminal ends of each of horizontal bracing members 5a, 5a' again with a connector plate 41. The vertical end bracing members 5d are positioned inwardly from the terminal ends of the horizontal bracing members 5a, 5a' so as to provide enough space on the members 5a for the gripping plates 27 previously described.

The use of vertical end members 5d in the prefabricated planar arrangements shown in FIGS. 12 and 13 provides for easier handling on the construction site since the prefabricated planar arrangements of bracing members 5 will not have open end portions as exemplified by the substantially "Z-shaped" arrangements of FIGS. 10 and 11, which may be more capable of becoming engaged or caught with other objects on the job site than is the case with the closed planar arrangements illustrated in FIGS. 12 and 13. As well, in the closed arrangement of bracing members of FIGS. 12 and 13, there is a greater structural integrity at the ends of the planar arrangement, such that there is less likelihood that the assembly will be damaged if it is accidentally dropped during transport or during assembly and disassembly of a scaffolding structure.

Figure 14:
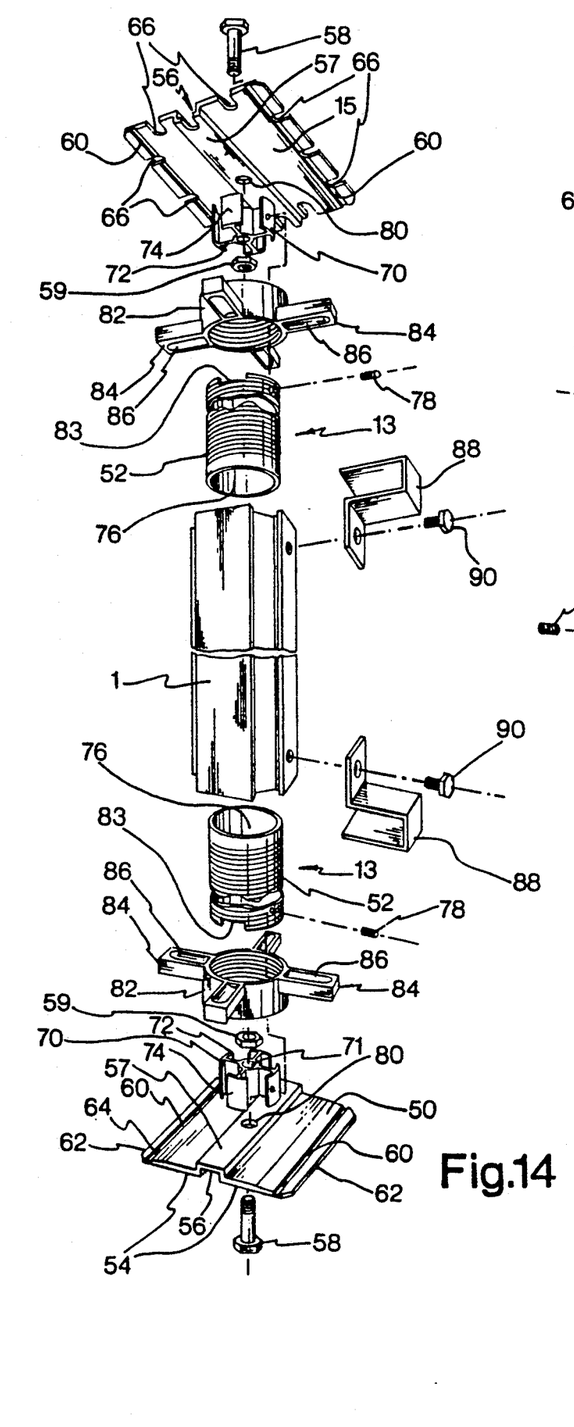
FIG. 14 is an exploded perspective view of a post member of the scaffolding assembly, showing the height adjustment means therefor and top and bottom support plates for the post.

Turning now to FIG. 14, details of the height adjustment means 13 for the post members 1 of the modular scaffolding assembly are shown. Each height adjustment means 13 comprises a hollow screwjack 52 having one end thereof being slidably received in slip-fit engagement with the hollow portion 16 (FIG. 2) of post members 1, which constitutes a corresponding longitudinal bore for the screwjack 52. The other end of the screwjack is provided with a support plate, which may be in the form of a plain support plate 50, shown adjacent the lower terminal end of the post member 1, or alternatively, in the form of a slotted support plate 15 which is shown adjacent the upper terminal end of the post member 1. One kind or the other of these support plates may be used at either end of the post members 1, whether at the top or bottom thereof.

Each screwjack 52 has a collar nut 82 thereon for abutment with a terminal end of the post member 1 adjacent the receiving bore 16 for the screwjack 52. The collar nut 82 is rotatably displaceable along the length of the screwjack 52 to thereby adjust the longitudinal extension of the screwjack with respect to the post member. The collar nut preferably provides a plurality of handle means 84 extending radially therefrom to facilitate the rotatable displacement of the collar nut along the length of the screwjack 52. As shown in the drawings, the handle means 84 of the collar nut 82 may have material removed therefrom in order to reduce the weight of the collar nut. This may be accomplished, for instance, by providing a deep groove 86 on each of the upper and lower faces of the handles 84 (best shown in phantom lines in FIG. 16).

In order to prevent the collar nut 82 from being inadvertently rotated beyond the end of the hollow screwjack 52 which is adjacent a terminal end of the post member 1, the end of the screwjack which is introduced into the receiving bore 16 of the post member may be smooth-surfaced as shown in FIG. 14. Thus, the threaded portion of the screwjack is confined to a limited portion of its length, so as not to allow rotation of the collar nut beyond the threaded portion.

A stopper means 88 may be provided adjacent each terminal end of a post member 1 where a height adjustment means 13 has been employed. The stopper means 88 is a generally U-shaped arm which allows for unobstructed rotation of the collar nut 82 on the screwjack 52 while retaining the height adjustment means 13 within the corresponding bore of the post 1 when the post is lifted off a support surface therefor. The stopper means is affixed to the post by a screw fastener 90 or the like.

The plain support plate 50 affixed to the screwjack 52 has a substantially planar support surface 54, and it further provides a centrally disposed channel 56 recessed from the said support surface 54 for receiving fastening means such as a bolt fastener 58 for connecting the plate 50 to the screwjack 52. As well, the support plate 50 provides a pair of grooves 60 which each run parallel to the centrally disposed channel 56 and respectively adjacent an edge 62 of the plate. The grooves 60 act as drilling guides which enable apertures 64 to be more easily made in the plate 50. These apertures 64 allow the support plate 50 to be bolted or otherwise securely fastened to a support surface on which the scaffolding assembly is placed.

Figure 16:
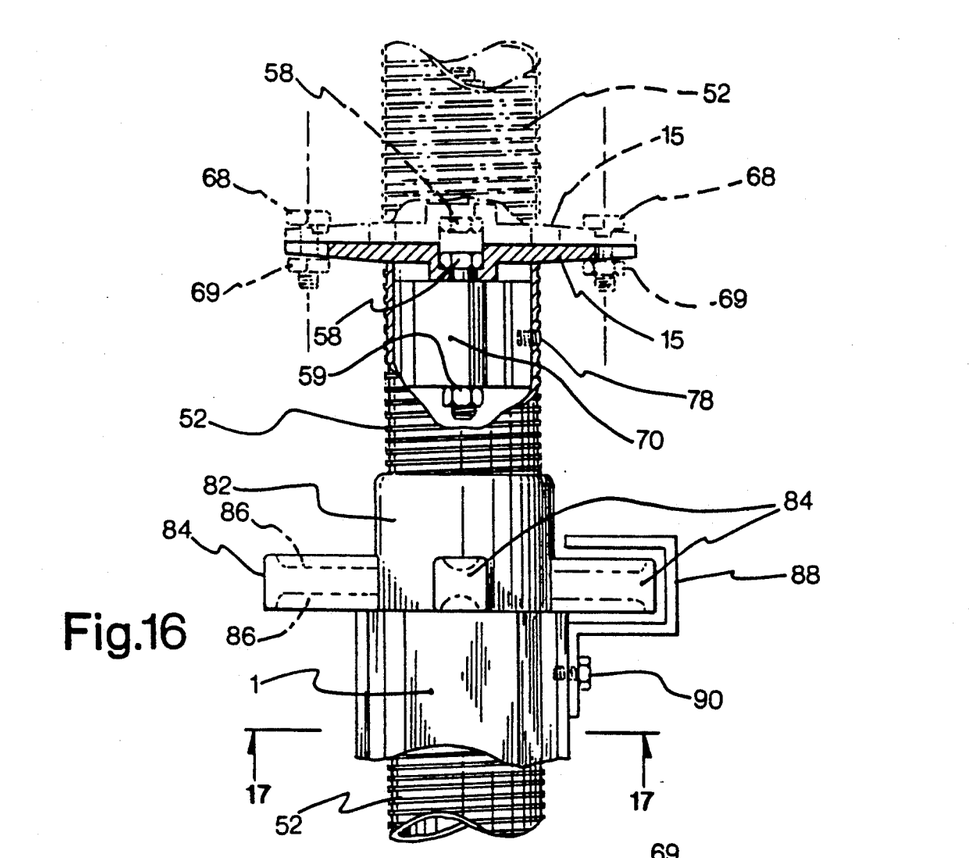
FIG. 16 is a detailed and partially sectioned side view showing two support plates which have been placed back-to-back in order to increase the vertical extension of the post members of the scaffolding assembly.
Figure 17:
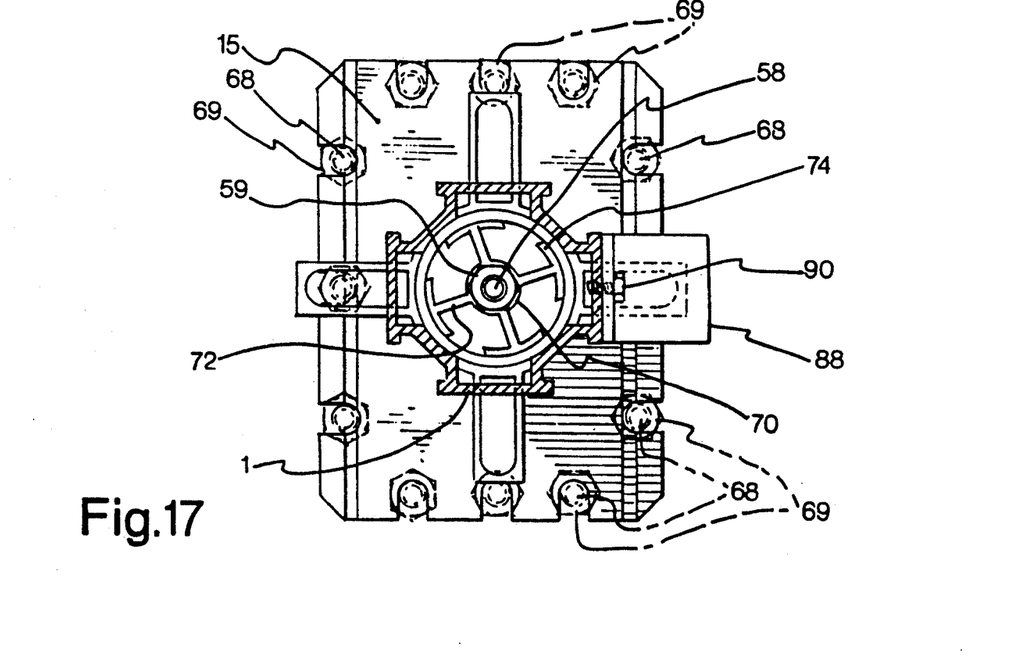
FIG. 17 is a bottom sectional view of the post member of the assembly, taken along line 17-17 of FIG. 16.

The support plate 15, which is shown adjacent the upper terminal end of post member 1 in FIG. 14, is of identical construction to support plate 50 previously described, with the exception that a plurality of slots 66 are provided in a spaced apart configuration adjacent the peripheral edges of the plate. These slots 66 permit two of the support plates 15 to be placed in a back-to-back configuration and affixed the one to the other by bolt fasteners 68 held in place by nuts 69, as is best shown in FIGS. 16 and 17 of the drawings. This type of arrangement therefore permits two post members 1 or 101 to be placed one atop the other in a spliced configuration whenever it is necessary to increase the vertical extension of the post members.

The support plates 15 or 50 are connecting to the hollow screwjack 52 by means of a cruciform connector element 70 fixed to the plates. The element 70 has four substantially perpendicularly disposed webs 72, whose terminal ends have curved flanges 74 extending therefrom. The connector element is received in a corresponding bore which is the inner wall 76 of the hollow screwjack by sliding engagement of the outer surfaces of the flanges 74 therewith. The connector element 70 is retained in the bore of the screwjack by at least one screw fastener 78 introduced through the outer wall of the screwjack 52 and into a said curved flange 74 of the connector element 70. The connector element 70 has a central cylindrical portion 71 for receiving a bolt fastener 58 and corresponding nut 59 for affixing the connector element 70 to a support plate 15 or 50, as the case may be. The bolt 58 is introduced through an aperture 80 located on each of the support plates 15 and 50. In order to permit a more secure connection of the hollow screwjack 52 to each of the support plates 15 or 50, the lower terminal end of the screwjack 52 is provided with a pair of aligned notches 83 for receiving the raised central portion 57 of the support plates.

Figure 15:
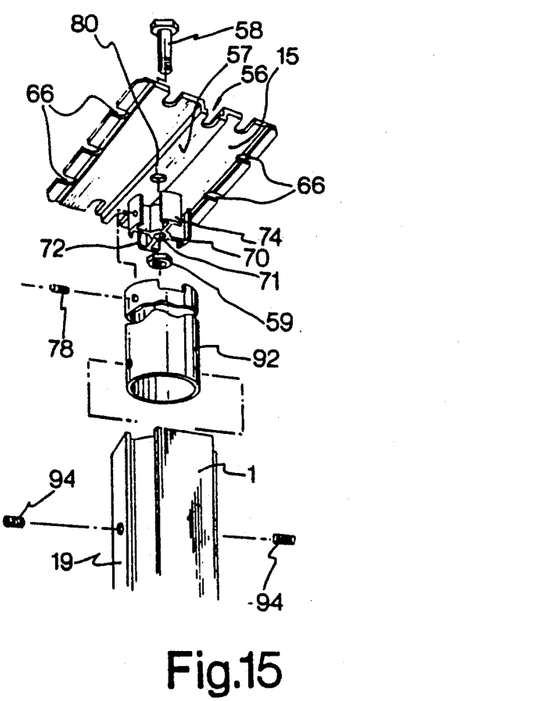
FIG. 15 is a partial perspective exploded view of one end of a post member having a sleeve insert therein, and to which a support plate is attached.

Those skilled in this art will readily appreciate that the height adjustment means 13 described hereinabove may be provided at either or both of the top and bottom ends of a post member 1 or 101. Where the height adjustment means is omitted, the hollow screwjack 52 may be replaced with a smooth-surfaced sleeve 92 which, like screwjack 52, is received in the corresponding bore 16 of the post members (FIG. 15). The sleeve 92 is affixed to the support plate 15 in the same manner as the screwjack 52, by means of a headless screw fastener 78 introduced into the outer wall of sleeve 92 and into one of the curved flanges 74 of the connector element 70. The other end of the sleeve 92 received in the bore 16 of post member 1 is retained therein also by means of a headless screw fastener 94 introduced into one of the abutment surfaces 19 of the post member.

Figures 18, 19:
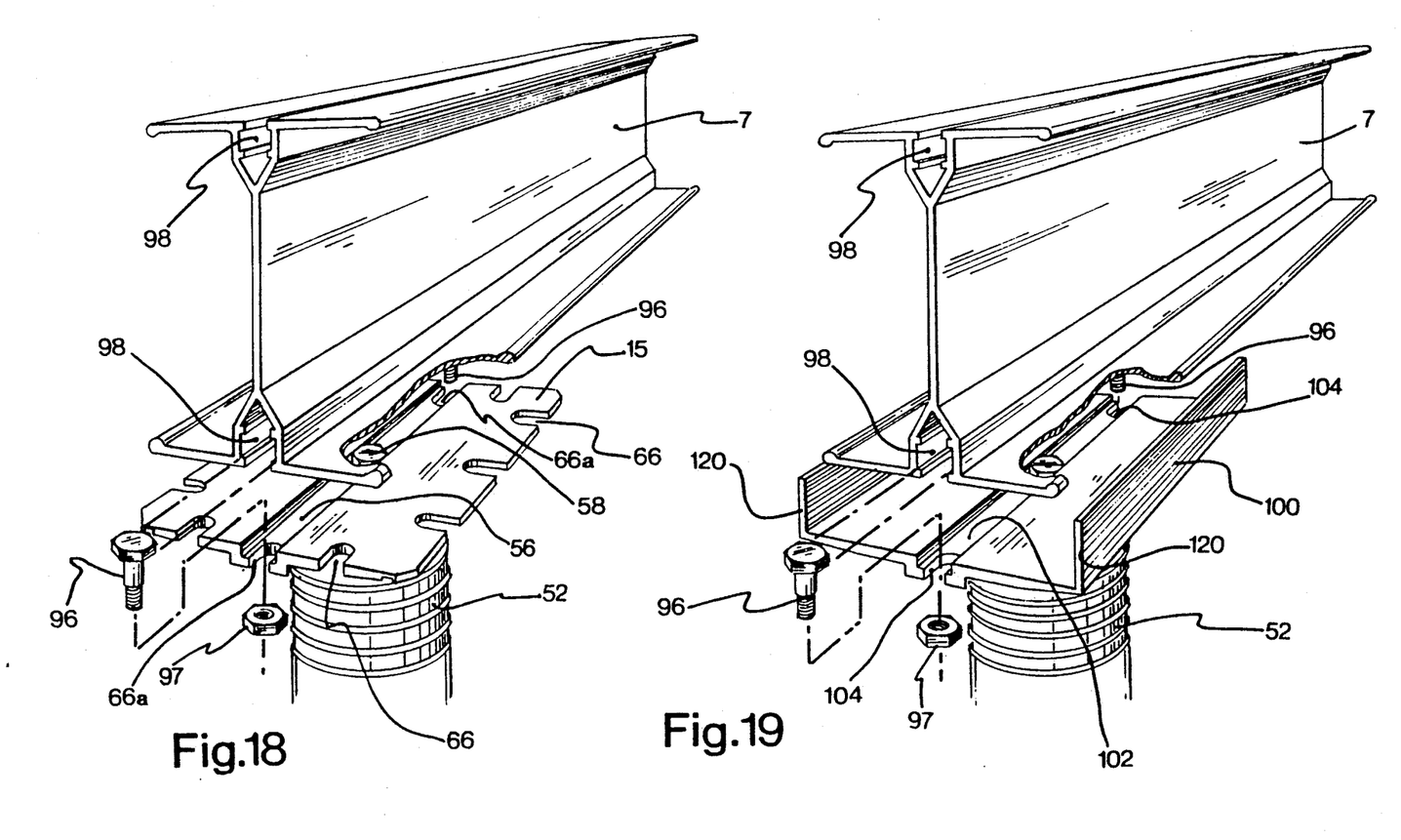
FIG. 18 is a perspective view adjacent the upper terminal end of a post member, which shows the connection of a support plate to a ledger beam.
FIG. 19 is another perspective view of a support channel employed adjacent the upper terminal ends of a post member for supporting a ledger beam thereon.

With reference to FIGS. 18 and 19, the details of the attachment of a ledger beam 7 to the upper terminal ends of the post members is illustrated. Each of the slotted support plates 15 of the scaffolding assembly which are placed in a linear arrangement may be connected to a ledger beam 7 or any other suitable structural member by means of bolts 96 and corresponding nuts 97. Each nut and bolt 96, 97 is received in the slot 66a centrally located in the channel 56 of slotted support plate 15, one such slot being disposed at each end of the channel. The heads of the bolts 96 are received in a bolt retaining slot 98 which extends longitudinally the entire length of the ledger beam 7.

In FIG. 19, the ledger beam 7 is supported by the scaffolding assembly by way of a support channel 100. The support channel has two upwardly extending flange portions 120 which assist in centering the ledger beam 7 when it is placed onto the channel support 100. The channel support 100, like the slotted support plate 15, provides a centrally disposed channel 102 which runs parallel to the flanges 120 thereof. The channel 102 is provided with a slot 104 at each end thereof for receiving nut and bolt 96, 97 for retaining the ledger beam 7 in an analogous manner to that explained above for support plate 15.

Figure 20:
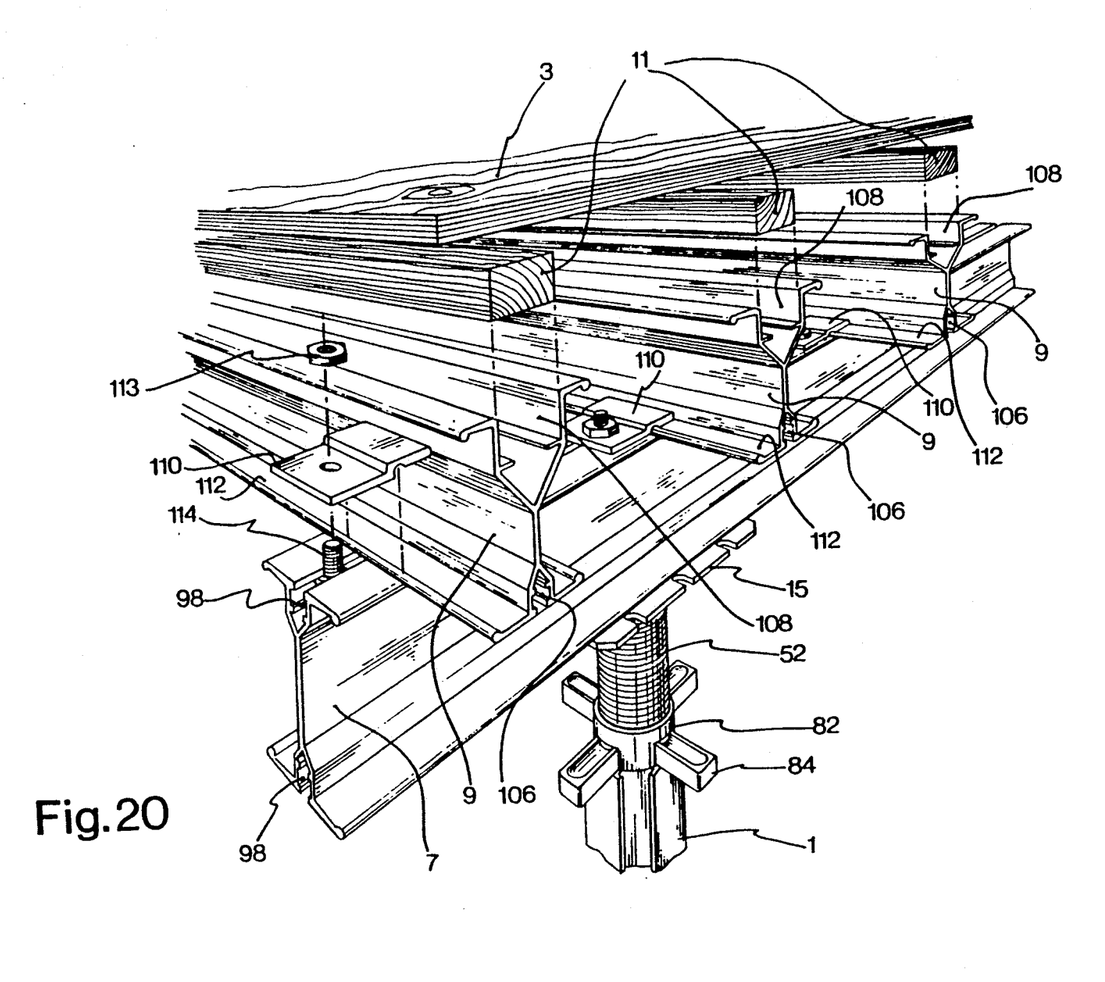
FIG. 20 is a partial perspective view illustrating a typical configuration of a ledger beam and transverse joists placed thereon for supporting a plywood panel onto which a concrete floor slab is to be poured, there being further illustrated a post member of the scaffolding assembly used to shore the ledger beam.

As shown in FIG. 20, each ledger beam attached to the support plates 15 of the scaffolding assembly in turn supports a plurality of transversely disposed joist beams 9 placed thereacross. Like the ledger beam 7, each joist beam 9 has a bolt retaining slot 106 adjacent its lower end, the bolt retaining slot 106 extending longitudinally the entire length thereof. At the opposite end of the joist beam, however, there is provided an open channel portion 108 which is adapted to receive the elongate wooden inserts 11 as previously described. The joist beams 9 are secured to the ledger beams 7 by means of a stepped clip member 110 having an indentation therein to engage with a corresponding longitudinal bead provided on the edge of flange 112 of each joist 9. The clip member 110 is urged downwardly against the flange 112 by tightening a nut and bolt assembly 113, 114, the head of bolt 114 being retained in the bolt retaining channel 98 of ledger member 7. In this manner, the joist members 9 are securely held in place during the placement and fixing of sheathing panels 3 onto the joists, or during the lifting and transport of the entire scaffolding assembly when same is to be used as a flying form.

Those skilled in this art will readily appreciate that various modifications of detail may be made to the present invention, all of which are intended to come within its spirit and scope.

What I claim as my invention is:

1. A scaffolding assembly for use in structural shoring; said assembly comprising:

an elongate post member, said post member providing at least one receiving means, said receiving means running in a direction longitudinally of said post member and presenting an abutment surface facing outwardly of said post member, said receiving means further having a pair of longitudinal edges, each of which extends outwardly from the said abutment surface so as to form a respective gap between said post member and said longitudinal edges of the receiving means thereof;

at least two fastener means, said fastener means each having a head portion and a shank portion;

a bracing member for connection between two adjacent post members of the assembly, said bracing member having a terminal end for flush contact with said abutment surface of said receiving means, the bracing member further having at least one pair of substantially T-shaped and outwardly open continuous slots running longitudinally of the bracing member, said slots each slidably retaining the head of one of said fastener means while allowing the shank thereof to extend outwardly from said slots; and gripping means provided adjacent said terminal end of said bracing member, said gripping means constituting means for engaging said longitudinal edges of said receiving means to thereby secure said bracing member to the post member, said terminal end of the bracing member contacting said abutment surface when the gripping means is engaged with the longitudinal edges of said receiving means, said gripping means comprising a pair of opposed plates, said plates each having a corresponding groove therein at one end thereof for mating respectively with said longitudinal edges of said receiving means, said plates each further having a corresponding aperture means therein for respective slidable engagement of said plates with a corresponding shank of said fastener means; the gripping plates being urged together by the respective displacement thereof along the shanks of said fastener means so as to secure said bracing member to the post member.

2. The scaffolding assembly as defined in claim 1, further having a plurality of bracing members in a prefabricated planar arrangement for connection to said post member.

3. The scaffolding assembly as claimed in claim 2 wherein each of said bracing members has substantially T-shaped slots running longitudinally thereof and further fastener means are retained in said slots, and further comprising connector plates attached to adjacent bracing members by said further fastener means for connecting said bracing members one to the other.

4. The scaffolding assembly as defined in claim 3, wherein the assembly further includes height adjustment means for the post member, said height adjustment means comprising a screwjack having one end thereof being slidably received in slip-fit engagement with a corresponding longitudinal bore in said post member, and having another end thereof provided with a support means, the screwjack further having a collar means thereon for abutment with a terminal end of said post member adjacent said bore, said collar means being rotatably displaceable along the length of the screwjack to thereby adjust the longitudinal extension of said screwjack with respect to the post member, and wherein said support means is connected to said screwjack by means of a cruciform connector element fixed to said support means, the element having four substantially perpendicularly disposed webs, terminal ends of said webs having curved flanges extending therefrom, the connector element being received in a corresponding bore in the screwjack by sliding engagement of outer surfaces of said flanges therewith, and wherein said connector element is retained in said bore of the screwjack by at least one screw fastener introduced through said screwjack and into a said curved flange of the connector element.

5. The scaffolding assembly as defined in claim 4, wherein said connector element has a central cylindrical portion and further includes a bolt fastener for affixing the connector element to said support means, said bold fastener being received in said central portion.

6. The scaffolding assembly as defined in claim 4, wherein said support means is a support plate which has a substantially planar support surface and provides a channel recessed therefrom for receiving fastening means for attachment of the scaffolding system to a structural member which is shored thereby.

7. The scaffolding assembly as defined in claim 6, wherein said support plate provides a plurality of slots at peripheral edges thereof, to thereby allow two said support plates to be placed in a back-to-back configuration and affixed the one to the other by bolt fasteners received in said slots.

8. The scaffolding assembly as defined in claim 7, wherein said post member having four of said receiving means each respectively for a bracing member.

9. The scaffolding assembly as defined in claim 8, wherein each of said receiving means is disposed around the periphery of the post at 90 degree intervals.

10. The scaffolding assembly as defined in claim 9, wherein said post member is hollow.

11. The scaffolding assembly as defined in claim 10, wherein said screwjack is hollow.

12. The scaffolding assembly as defined in claim 11, wherein said post member is an integral extrusion.

13. The scaffolding assembly as defined in claim 12, wherein said bracing member is an integral extrusion.

14. The scaffolding assembly as defined in claim 13, wherein said post member and said bracing member are composed of aluminum alloy.

* * * * *